US 12,039,762 B2

(12) United States Patent
Li et al.

(10) Patent No.: US 12,039,762 B2
(45) Date of Patent: Jul. 16, 2024

(54) ATTRIBUTE-BASED POINT CLOUD STRIP DIVISION METHOD (71) Applicant: PEKING UNIVERSTIY SHENZHEN GRADUATE SCHOOL, Shenzen (CN)

(72) Inventors: Ge Li, Guangdong (CN); Yiting Shao, Guangdong (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 565 days.

(21) Appl. No.: 17/265,927

(22) PCT Filed: Apr. 12, 2019

(86) PCT No.: PCT/CN2019/082393
§ 371 (c)(1),
(2) Date: Feb. 4, 2021

(87) PCT Pub. No.: WO2020/206671
PCT Pub. Date: Oct. 15, 2020

(65) Prior Publication Data
US 2021/0295568 A1 Sep. 23, 2021

(30) Foreign Application Priority Data

Apr. 9, 2019 (CN) .......................... 201910280533.2

(51) Int. Cl.
G06K 9/00 (2022.01)
G06F 7/24 (2006.01)
(Continued)

(52) U.S. Cl.
CPC ................ *G06T 9/001* (2013.01); *G06F 7/24* (2013.01); *G06T 7/10* (2017.01); *G06T 2207/20021* (2013.01)

(58) Field of Classification Search
CPC .. G06T 9/001; G06T 7/10; G06T 2207/20021
See application file for complete search history.

(56) References Cited

U.S. PATENT DOCUMENTS 9,165,383 B1 * 10/2015 Mendez-Rodriguez ..................... G06T 11/001
2020/0092584 A1 * 3/2020 Cai ........................ H04N 19/62
(Continued)

FOREIGN PATENT DOCUMENTS

CN 103077549 A * 5/2013
CN 103247041 A * 8/2013
(Continued)

OTHER PUBLICATIONS

Octree-based Point-Cloud Compression, Ruwen Schnabel et al., Eurographics Symposium on Point-Based Graphics, 2006, pp. 1-11 (Year: 2006).*

(Continued)

*Primary Examiner* — Jayesh A Patel
(74) *Attorney, Agent, or Firm* — Burr & Forman LLP (57) ABSTRACT An attribute-based point cloud strip division method. The method comprises: first, performing spatial division of a certain depth on a point cloud to obtain a plurality of local point clouds; and then, sorting the attribute values in the local point clouds, and on the basis of such, further performing point cloud strip division so as to obtain point cloud strips that have low geometric overhead and a uniform number of points. By means of comprehensively using the spatial position and attribute information of the point clouds, the points having similar attributes and related spatial positions are gathered as much as possible in one strip during strip division, which is convenient for making full use of the redundancy of the attribute information between adjacent points, and improving the performance of point cloud attribute compression. At the same time, independent coding (Continued)

between strips supports random access, improves coding efficiency, and prevents the accumulation and spread of coding errors, thus enhancing the fault tolerance of the system.

5 Claims, 6 Drawing Sheets

(51) Int. Cl.
*G06T 7/10* (2017.01)
*G06T 9/00* (2006.01)

(56) References Cited

U.S. PATENT DOCUMENTS

| | | | | |
|---|---|---|---|---|
| 2020/0304865 | A1* | 9/2020 | Yea | H04N 19/169 |
| 2020/0311984 | A1* | 10/2020 | Yea | G06T 9/004 |
| 2021/0211721 | A1* | 7/2021 | Park | H04N 19/46 |

FOREIGN PATENT DOCUMENTS

| | | | | |
|---|---|---|---|---|
| CN | 103645480 | A | | 3/2014 |
| CN | 103701466 | A * | | 4/2014 |
| CN | 106780509 | A | | 5/2017 |
| CN | 106846425 | A * | 6/2017 | G06T 9/001 |
| CN | 108241871 | A * | 7/2018 | G06K 9/0063 |
| CN | 108257173 | A | | 7/2018 |
| CN | 108335335 | A | | 7/2018 |
| CN | 108470374 | A * | 8/2018 | G06T 17/005 |
| CN | 108765571 | A * | 11/2018 | |
| CN | 109345619 | A * | 2/2019 | G06T 17/005 |
| EP | 3407607 | A1 | | 11/2018 |

OTHER PUBLICATIONS

Out-of-Core Visualization of Classified 3D Point Clouds, Rico Richter et al., Springer, 2015, pp. 227-242 (Year: 2015).*
A Computer Method for Generating 3D Point Cloud from 2D Digital Image, Nur Ilham Aminullah Abdulqawi et al., Journal of Image and Graphics, 2016, pp. 89-92 (Year: 2016).*
Robust Segmentation of Multiple Intersecting Manifolds from Unoriented Noisy Point Clouds, J. Kustra et al., Computer Graphics forum, 2014, pp. 73-87 (Year: 2014).*
Refinement of LiDAR point clouds using a super voxel based approach, Minglei Li et al., Elsevier, 2018, pp. 213-221 (Year: 2018).*
Hierarchical Segmentation Based Point Cloud Attribute Compression, Ke Zhang et al., IEEE, 2018, pp. 3131-3135 (Year: 2018).*
Point Cloud Attribute Compression via Clustering and Intra Prediction, Ke Zhang et al., IEEE, 2018, pp. 1-5 (Year: 2018).*
Point Cloud Segmentation and Semantic Annotation Aided by GIS Data for Heritage Complexes, A. Murtiyoso et al., 2019, pp. 523-528 (Year: 2019).*
Processing UAV and LIDAR Point Clouds in Grass GIS, V. Petras et al., 2016, pp. 945-952 (Year: 2016).*
International Search Report and Written Opinion from related international application PCT/CN2019/082393, mailed on Jan. 6, 2020.

* cited by examiner

| Test condition | Lossless geometric compression and lossy attribute compression Attribute Code Rate True + Distortion Rate [%] | | | |
|---|---|---|---|---|
| | Brightness | Chroma Cb | Chroma Cr | Reflectance Rate |
| First type of data set Cat1-A | +2.3% | +1.6% | +1.2% | -1.2% |
| Second type of data set Cat3-fused | +18.1% | +15.8% | +5.4% | 0.0% |
| Third type of data set Cat3-frame | | | | |
| Average performance | +4.2% | +3.3% | +2.9% | -0.3% |

FIG. 4

ATTRIBUTE-BASED POINT CLOUD STRIP DIVISION METHOD

TECHNICAL FIELD

The invention belongs to the technical field of point cloud data processing, and relates to a point cloud data segmentation and compression method, in particular to an attribute-based point cloud strip division method.

BACKGROUND ART

A three-dimensional point cloud is an important form of digital representation in the real world. With the rapid development of three-dimensional scanning equipment (laser, radar, etc.), the precision and resolution of the point cloud are higher. A high-precision point cloud is widely used in geographic information systems, urban digital map construction and free-view broadcasting, and plays a technical support role in hot research such as smart city, unmanned driving, cultural relics protection, and so on. The point cloud is obtained by sampling the surface of an object by three-dimensional scanning equipment, the number of points of one frame of the point cloud is generally millions, the number of points in a large point cloud is even as high as tens of millions, each point contains geometric information, color, texture and other attribute information, and the data volume is very large. The huge data volume of a three-dimensional point cloud brings great challenges to data storage, transmission, and so on. In order to support parallel processing of point cloud and improve system fault tolerance, it is necessary to divide point cloud into a series of independently processable point cloud strips.

At present, the research on the division technology of point cloud strips is not common and is still in the exploration stage. However, the division of strips in traditional video coding is mainly divided into 2 types:

1) uniform strip division of a video image: uniformly dividing the single-frame image to obtain strips with the same geometric size;
2) non uniform strip division of a video image: non-uniform division being carried out on the single-frame image, and the geometric sixes of the obtained strips being different.

SUMMARY OF THE INVENTION

In order to relieve the pressure of point cloud transmission and storage, the invention provides an attribute-based point cloud strip division method under the condition of considering computational coding performance and complexity.

The technical scheme provided by the invention comprises, first, performing spatial division of a certain depth on a point cloud to obtain a plurality of local point clouds; and then, sorting the attribute values in the local point clouds, and based on such, further performing point cloud strip division to obtain point cloud strips that have low geometric overhead and a uniform number of points. By means of comprehensively using the spatial position and attribute information of the point clouds, the points having similar attributes and related spatial positions are gathered as much as possible in one strip during strip division, which is convenient for making full use of the redundancy of the attribute information between adjacent points, and improving the performance of point cloud attribute compression. At the same time, independent coding between strips supports random access, improves coding efficiency, and prevents the accumulation and spread of coding errors, thus enhancing the fault tolerance of the system.

The invention mainly comprises the following steps of:
1) preliminarily dividing a point cloud to obtain local point clouds:
reading in point cloud to be processed, firstly preliminarily dividing geometric space of the point cloud, and then obtaining one group of local point clouds with sequence by sorting;
2) strip division based on attribute sorting:
iterating all local point clouds, and sorting attribute values in each local point cloud, wherein 2 common attribute type color and reflectance rate are taken as examples, but not limited to the 2 attributes;
if the attribute type of the point cloud is a color value, color component values being sorted in ascending order, and then current local point cloud being divided into uniform points according to a setting of the number of a strip; if the attribute type of the point cloud is resolution ratio, the resolution ratio values being sorted in ascending order, and then the current local point cloud being divided into uniform points according to the setting of the number of the strip; if the point cloud contains 2 attributes of color and resolution ratio at the same time, color brightness component values being taken as representatives to carry out ascending order sorting; the above steps making it possible that a point cloud strip with uniform points and close attributes can be obtained.

In step 1), the point cloud space is preliminarily divided by adopting a binary tree: there being N points in total of a point cloud to be processed, division depth being set by the binary tree as d, and $2^1$ local point clouds being obtained after the point cloud is divided d times; then, all local point clouds being numbered $b_1, b_2, \ldots, b_t, \ldots, b_{2^d}$ according to an order of breadth traversal.

The details of the point cloud binary tree division method in step 1) are: performing spatial division on the point cloud according to geometric information, selecting a coordinate axis with the largest distribution variance in point cloud position coordinate as a division axis each time, selecting a point with a coordinate size being a median value as a division point, performing iterative division until a set depth of the binary tree is reached, and obtaining local point cloud with almost equal points after division.

In step 2), ascending order is performed on a brightness component of a color, but not limited to the brightness component; assuming that color values in the local point cloud b (i) are R(n). G(nL, B(n), the calculation formula of the brightness component is as follows:

$$Y(n)=\text{round}(0.2126*R(n)+0.7152*G(n)+0.0722*B(n)) \quad \text{(Formula 1)}.$$

The details of redividing the local point cloud in step 2) are as follows: assuming that strip division number of the current point cloud is Num, $2^d$ local point clouds can be obtained through step 1), and in order to ensure that the points in each local point cloud are uniform, the strip number nuns of each local point cloud after re-division is as follows:

$$num=\text{ceil}(Num/2^d) \quad \text{(Formula 2)}.$$

The invention provides an attribute-based point cloud strip division method, which has the following technical advantages:
(1) one frame of the point cloud is divided into a plurality of strip structures by comprehensively utilizing the spatial position and the attribute information of the point cloud so that points with close attributes and related spatial positions are gathered in one strip as many as possible, the redundancy of the attribute information between adjacent points can be fully utilized, and the attribute compression performance of the point cloud is improved;

(2) independent coding between strips supports random access, improves coding efficiency, and prevents the accumulation and spread of coding errors, thus enhancing the fault tolerance of the system.

The invention will now be further described, by way of embodiments, with reference to the accompanying drawings, without in any way limiting the scope of the invention.

BRIEF DESCRIPTION OF THE DRAWINGS

FIGS. 2a and 2b are example diagrams of point cloud strip division, in which:

FIGS. 3a and 3b are example diagrams of point cloud strip division, in which:

DETAILED DESCRIPTION OF THE INVENTION

Aiming at point cloud data, the invention provides a new attribute-based point cloud strip division method, which comprehensively utilizes the spatial position and color information of the point cloud to divide one frame of point cloud into a plurality of strips with close attributes, wherein each strip can be independently coded and decoded, and the compression performance of the point cloud attribute is improved.

Example 1

Figure 1:
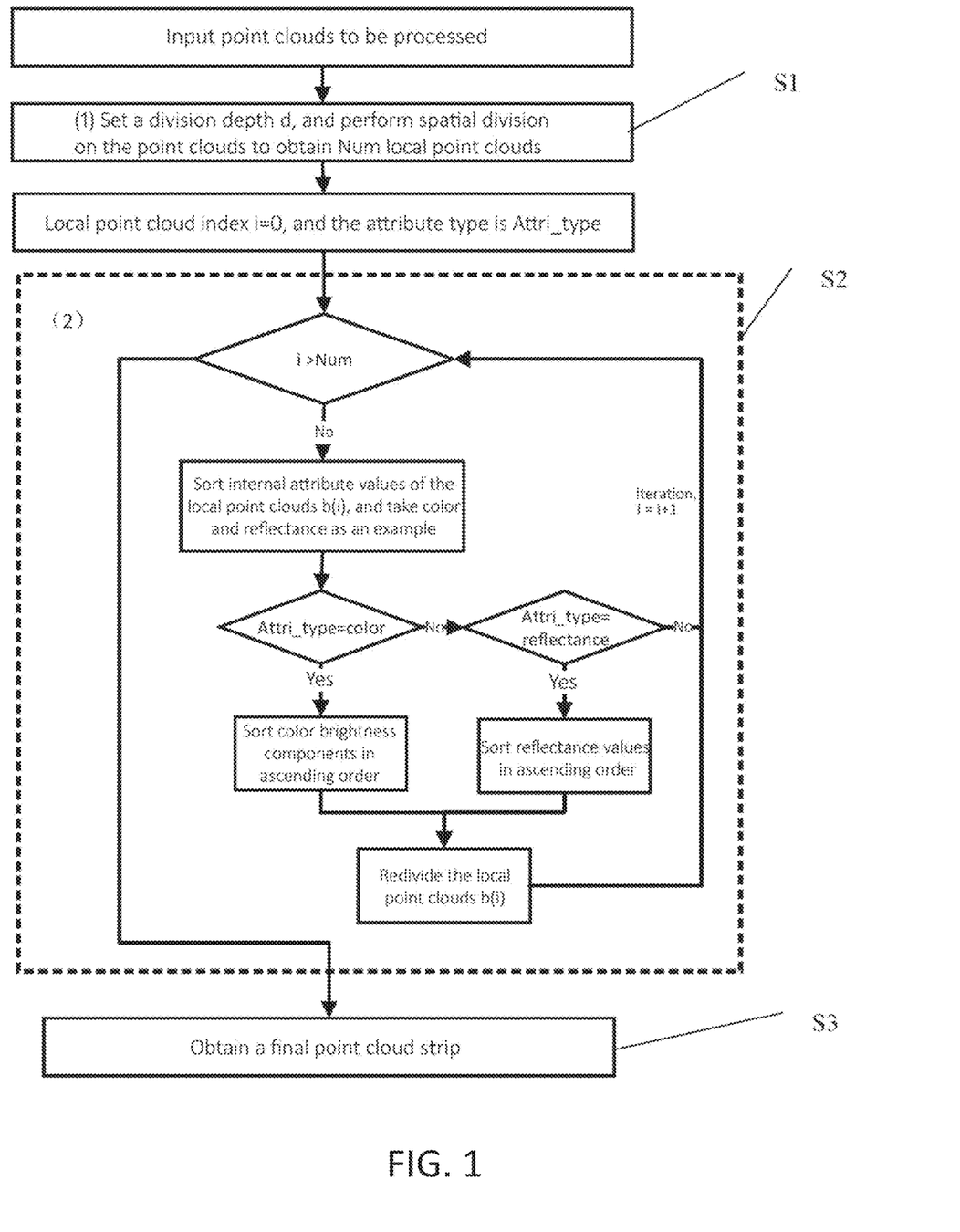
FIG. 1 is a flow diagram of the method of the present invention.

Aiming at an official point cloud data set longdress_vox10_1300.ply in a MPEG point cloud compression working group, a point cloud strip division is performed by adopting the method provided by the invention. The flow diagram of the method provided by the invention is shown in FIG. 1, and the specific implementation steps are as shown in FIG. 1 as follows.

(1) Preliminarily Dividing Point Clouds to Obtain Local Point Clouds

In the point cloud longdress_vox10_1300.ply, there are 857966 points, and the KB tree division depth d is set as 2. Alter division, there are $2^d$: 4 local point clouds, and the points of 4 local point clouds d (1), d (2), d (3) and d (4) are 214492, 214492, 214491 and 214491 respectively.

(2) Strip Dividing Based on Attribute Sorting

In the point cloud longdress_vox10_1300.ply, the attribute type is color. The number of strips of the point cloud in the frame is set as 16, and there are 4 local point clouds, so each local point cloud is redivided into 4 strips.

Before redividing, all points in each local point cloud are sorted in ascending order by color chrominance component values. Then each local point cloud is redivided into 4 strips on the principle of uniform points.

Figure 2A:
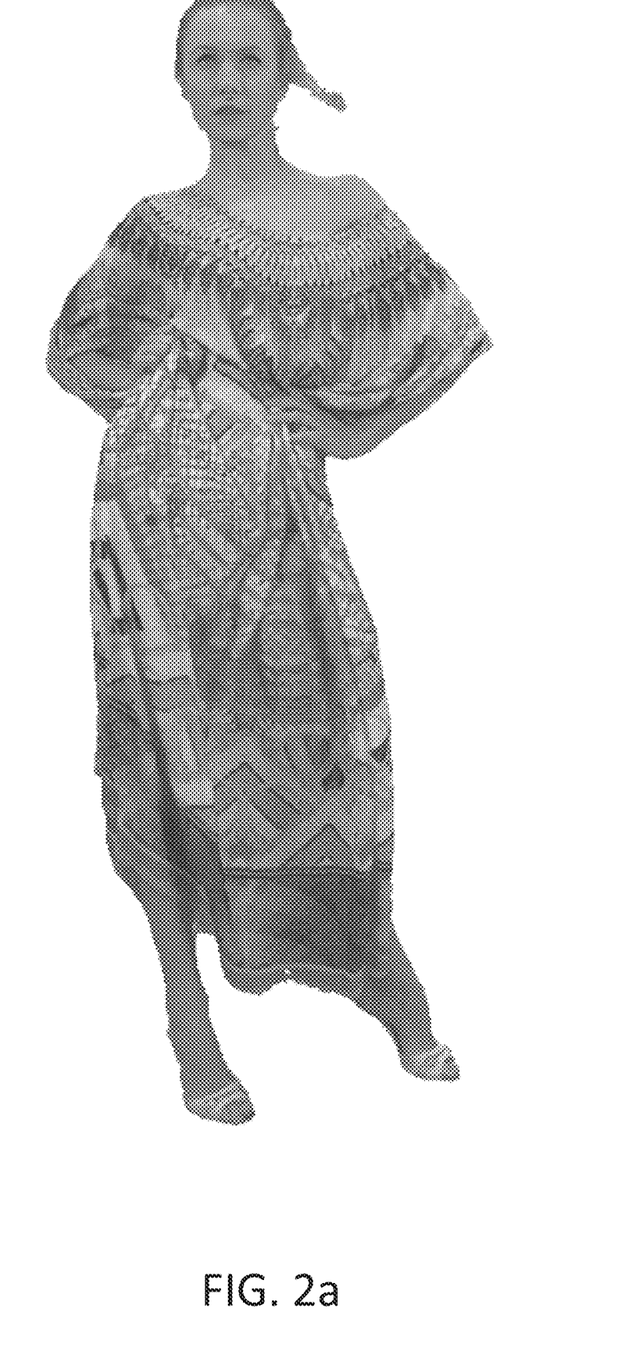
FIG. 2a is a complete point cloud longdress_vox10_1300.ply.
Figure 2B:
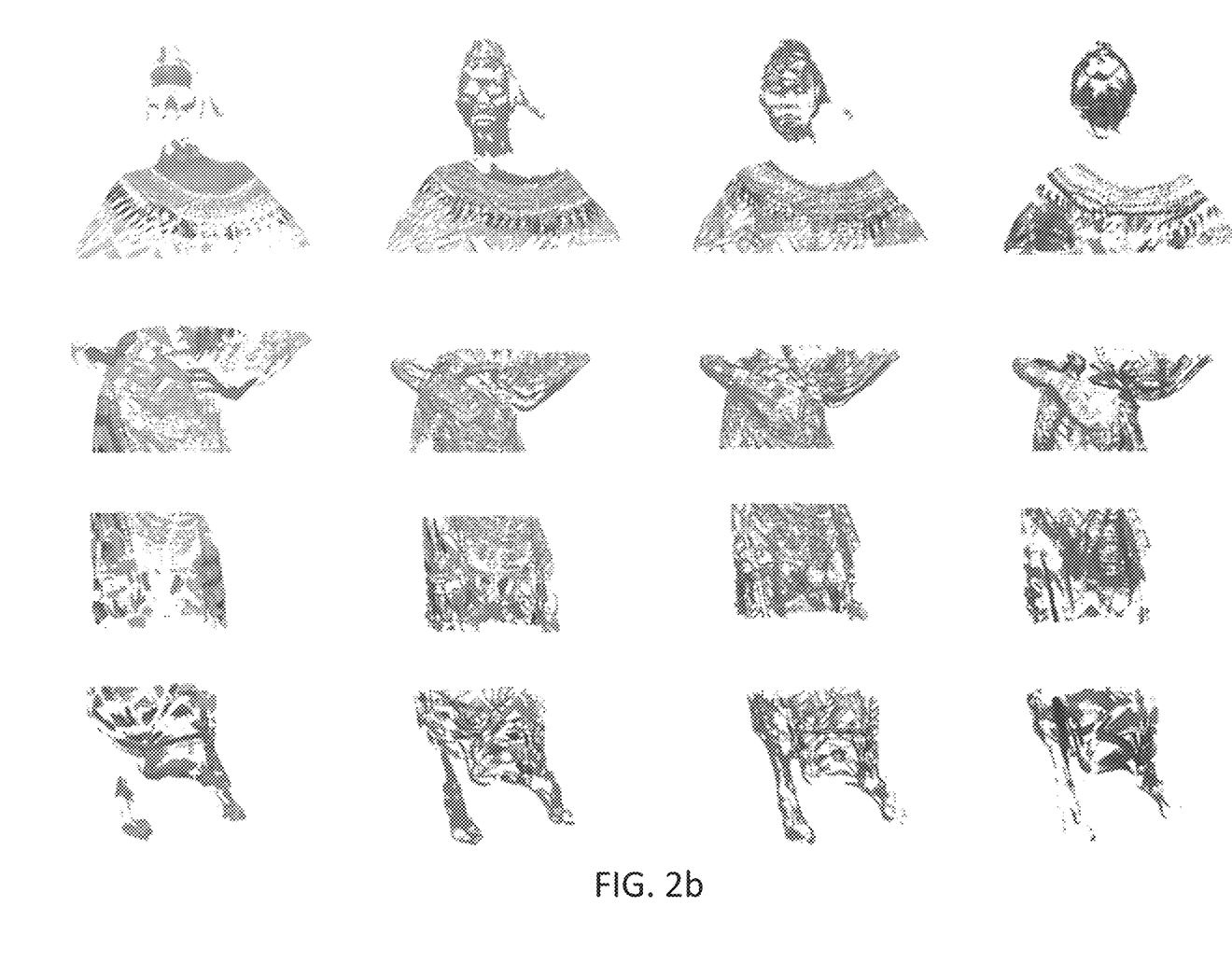
FIG. 2b shows that the point cloud is divided into 16 point cloud strips based on attribute sorting.

FIG. 2 is an example diagram of point cloud strip division, in which: FIG. 2(a) is complete point cloud longdress_vox10_1300.ply and FIG. 2(b) shows that the point cloud is divided into 16 point cloud strips based on attribute sorting. In the 16 strips, 4 transversely arranged strips form one group, and the bounding boxes in space are the same to form one local point cloud; 4 longitudinally arranged form one column, and the bounding boxes in space is equal to the bounding boxes of the origin point cloud. The geometric overhead of the bounding box can be effectively controlled by means of spatial geometric dividing and local attribute sorting and redividing, and meanwhile, local attribute correlation is enhanced. Circulating all the local point clouds, as shown in FIG. 2, the point cloud longdress_vox10_1300.ply is divided into 16 strips, of which the 12th and 16th points are 53622 in number and the other 14 strips points are 53623 in number.

Example 2

Aiming at an official point cloud data set Ford Ford_01_vox1mm-01011.ply in a MPEG point cloud compression working group, a point cloud strip division is performed by adopting the method provided by the invention. The specific implementation steps are as follows.

(1) Preliminarily Dividing Point Clouds to Obtain Local Point Clouds

In the point cloud Ford_01_vox1mm-01011.ply, there are 80265 points, and the KD tree division depth d is set as 1. After division, there are $2d^2$ local point clouds, and the points of 2 local point clouds d (1) and d (2) are 40133 and 40132, respectively.

(2) Strip Dividing Based on Attribute Sorting

In the point cloud Ford_01_vox1mm-01011.ply, the attribute type is resolution. The number of strips of the point cloud in the frame is set as 4, and there are 2 local point clouds, so each local point cloud is redivided into 2 strips.

Before redividing, all points in each local point cloud are sorted in ascending order according to the resolution attribute values. Then, according to the principle of uniform points, each local point cloud is redivided, and finally, the obtained points of the 4 strips are 20067, 20066, 20066 and 20066 respectively.

Figure 3A:
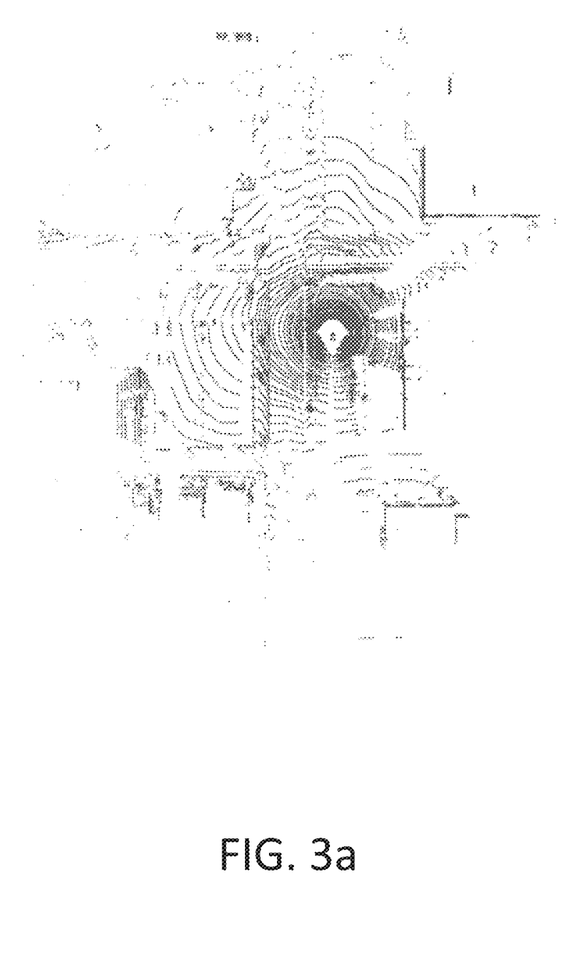
FIG. 3(a) is a complete point cloud Ford_01_vox1mm-01011.ply.
Figure 3B:
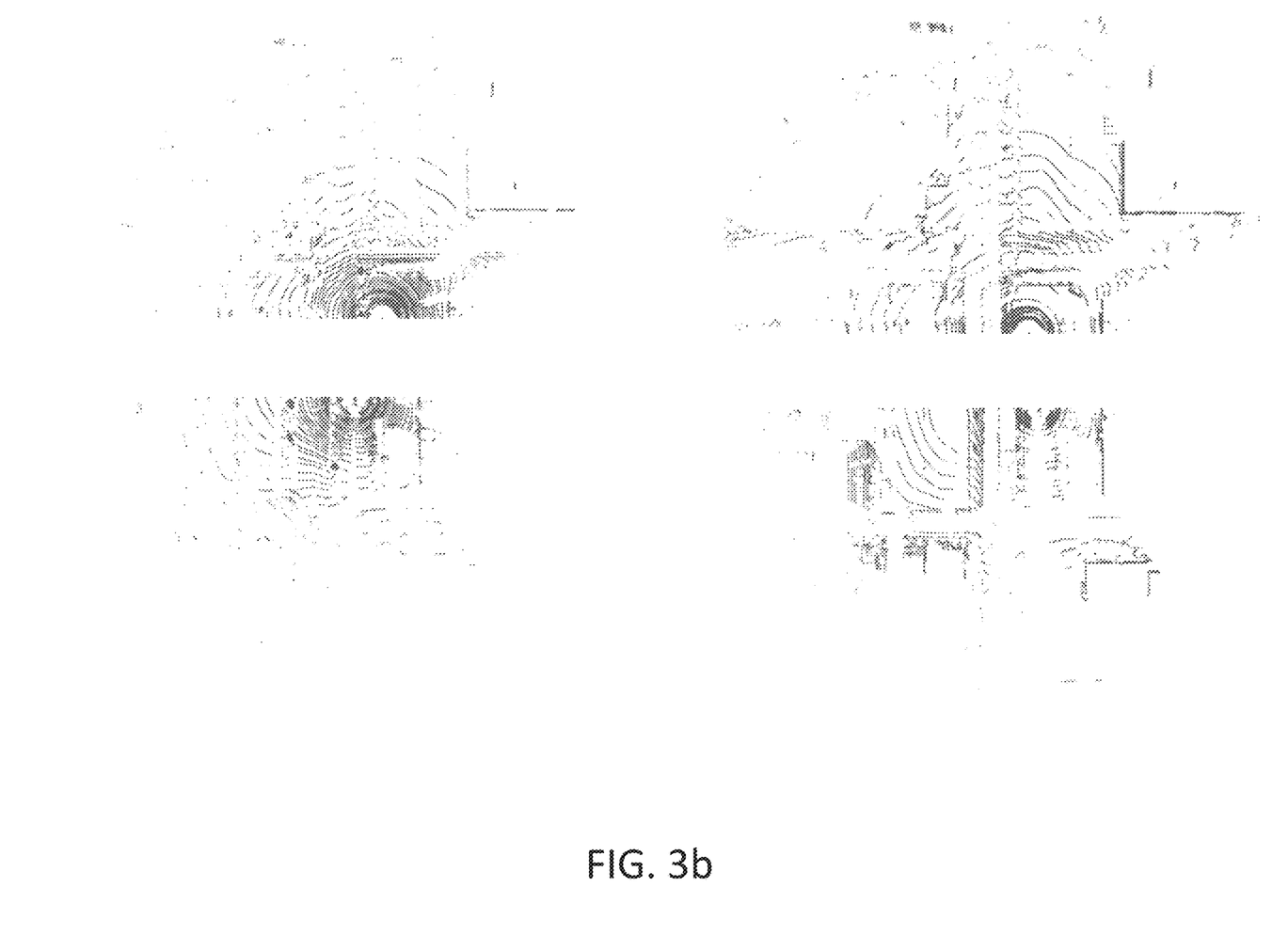
FIG. 3(b) shows that the point cloud is divided into 4 point cloud strips based on attribute sorting.

FIG. 3 is an example diagram of point cloud strip division, in which: FIG. 3(a) is complete point cloud Ford_01_vox1mm-01011.ply; and FIG. 3(b) shows that the point cloud is divided into 4 point cloud strips based on attribute sorting. In the 4 strips, 2 transversely arranged strips form one group, and the bounding boxes in space are the same to form one local point cloud: the 2 longitudinally arranged form one column, and the bounding boxes in space are equal to the bounding boxes of the origin point cloud. The geometric overhead of the bounding box can be effectively controlled by means of spatial geometric dividing and local attribute sorting and redividing, and meanwhile, local attribute correlation is enhanced.

Figure 4:
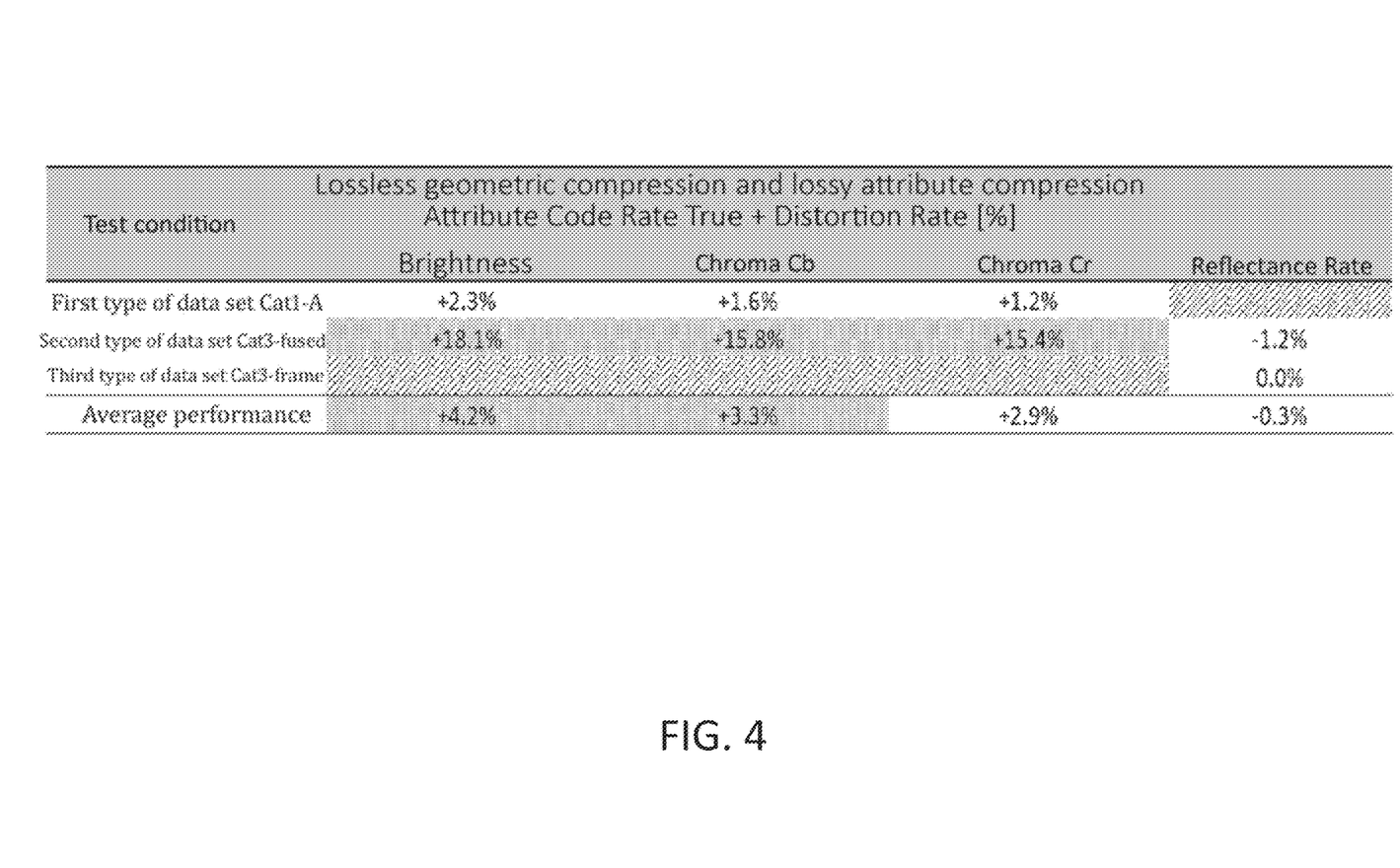
FIG. 4 is a graph of compression performance change of test sets before and after adaptive strip division.

The adaptive strip division method provided by the invention not only provides a parallel processing solution for the current point cloud compression method, but also improves the compression performance of some data sets. Under the condition of geometric lossless compression and attribute near-lossless compression according to the requirements of MPEG official experiments, the compression performance change of test sets before and after adaptive strip division is tested with the first type of data set Cat 1-A, the second type of data set Cat 3-fused and the third type of data set Cat 3-frame as test sets. FIG. 4 is a graph showing the compression performance change of the test sets before and after adaptive strip division. As shown in FIG. 4, it can be seen that a certain performance gain is obtained on the first type of data set and the second type of data set, wherein the maximum performance can reach 18.1% on the second type of data set Cat 3-fused.

It should be noted that the embodiments are disclosed to aid in a further understanding of the present invention, but those skilled in the art will appreciate that; various alternatives and modifications are possible without departing from the spirit and scope of the invention and the appended claims. Therefore, it is intended that the invention not be limited to the embodiments disclosed, and that the scope of the invention be determined by the scope defined by the claims appended hereto.

INDUSTRIAL APPLICABILITY

The attribute-based point cloud strip division method of the invention can be widely applied to the construction of geographic information systems and urban digital maps, free viewpoint broadcasting and the like, and plays a technical supporting role in hot research such as smart city, unmanned driving, cultural relics protection and so on.

The invention claimed is:

1. A strip division method for transforming a three dimensional object into digital form, wherein firstly spatial partitioning is performed on a point cloud at a certain depth to obtain local point clouds; then attribute types in each point cloud of the local point clouds are sorted and further point cloud partitioning is performed to obtain a point cloud strip with low geometric overhead and uniform points; the method comprises the following steps of:
   1) preliminarily partitioning a point cloud to obtain the local point clouds by splitting geometric space of the point cloud, and then obtaining one group of local point clouds with sequence by sorting;
   2) strip division of the local point clouds based on sorting by attribute type:
      wherein the sorting by attribute type comprises iterating all local point clouds, and sorting attribute types in each point cloud of the local point clouds,
   wherein the attribute types comprise a color value and a resolution ratio value;
   if the attribute type of the point cloud is the color value, then the color values are sorted in ascending order, and a current local point cloud is divided into uniform points according to a setting of a number of a strip;
   if the attribute type of the point cloud is the resolution ratio value, then the resolution ratio values are sorted in ascending order, and the current local point cloud is divided into uniform points according to the setting of the number of the strip; and
   if the point cloud contains attribute types of both the color value and the resolution ratio value at the same time, then color values are taken as representatives to carry out ascending order sorting;
   the above steps making it possible that the point cloud strip with uniform points and close attribute types of the three dimensional object is obtained.

2. The method according to claim 1, characterized in that in step 1), the geometric space of the point cloud is preliminarily divided by adopting a binary tree: there being N points in total of the point cloud to be processed, division depth being set by the binary tree as d, and $2^d$ local point clouds being obtained after the point cloud is divided d times; then, all local point clouds being numbered $b_1, b_2, \ldots, b_i, \ldots, b_{2^d}$ according to an order of breadth traversal.

3. The method according to claim 2, characterized in that the step 1) further comprises: performing spatial division on the point cloud according to geometric information, selecting a coordinate axis with the largest distribution variance in point cloud position coordinate as a division axis each time, selecting a point with a coordinate size being a median value as a division point, performing iterative division until a set depth of the binary tree is reached, and obtaining local point cloud with almost equal points after division.

4. The method according to claim 1, characterized in that in step 2), ascending order is performed on a brightness component of a color; assuming that color values in the local point cloud b (I) are R(n), G(n), B(n), the calculation formula of the brightness component is as follows:

$$Y(n)=\text{round}(0.2126*R(n)+0.7152*G(n)+0.0722*B(n))$$

5. The method according to claim 1, characterized in that details of the division of the local point cloud in step 2) are as follows: assuming that strip division number of the current point cloud is Num, $2^d$ local point clouds can be obtained through step 1), and in order to ensure that the points in each local point cloud are uniform, the strip number num of each local point cloud after re-division is as follows:

$$num=\text{ceil}(Num/2^d)$$

* * * * *

UNITED STATES PATENT AND TRADEMARK OFFICE
CERTIFICATE OF CORRECTION

| | | |
|---|---|---|
| PATENT NO. | : 12,039,762 B2 | Page 1 of 1 |
| APPLICATION NO. | : 17/265927 | |
| DATED | : July 16, 2024 | |
| INVENTOR(S) | : Ge Li et al. | |

It is certified that error appears in the above-identified patent and that said Letters Patent is hereby corrected as shown below:

On the Title Page

In Item (71), the Applicant, "PEKING UNIVERSTIY SHENZHEN GRADUATE SCHOOL, Shenzen (CN)" should read --PEKING UNIVERSITY SHENZHEN GRADUATE SCHOOL, Shenzhen (CN)--.

In the Claims

Column 6, Claim 4, Line 35, "cloud b (I)" should read --cloud b (1)--.

Signed and Sealed this
Twenty-sixth Day of August, 2025

Coke Morgan Stewart
*Acting Director of the United States Patent and Trademark Office*